US011903903B1

(12) United States Patent
Gardner

(10) Patent No.: US 11,903,903 B1
(45) Date of Patent: Feb. 20, 2024

(54) MULTI-FUNCTION PACIFIER ASSEMBLY

(71) Applicant: Kiyle Gardner, Havana, FL (US)

(72) Inventor: Kiyle Gardner, Havana, FL (US)

(*) Notice: Subject to any disclaimer, the term of this patent is extended or adjusted under 35 U.S.C. 154(b) by 0 days.

(21) Appl. No.: 18/449,853

(22) Filed: Aug. 15, 2023

Related U.S. Application Data

(60) Provisional application No. 63/397,998, filed on Aug. 15, 2022.

(51) Int. Cl.

| | |
|---|---|
| ***A61J 17/02*** | (2006.01) |
| ***A61J 17/00*** | (2006.01) |
| ***A61J 9/06*** | (2006.01) |
| ***A61J 9/00*** | (2006.01) |

(52) U.S. Cl.
CPC ............ *A61J 17/001* (2015.05); *A61J 9/001* (2013.01); *A61J 17/02* (2013.01); *A61J 17/105* (2020.05); *A61J 17/1011* (2020.05); *A61J 17/113* (2020.05); *A61J 17/1115* (2020.05)

(58) Field of Classification Search
CPC .......... A61J 17/001; A61J 17/02; A61J 17/10; A61J 17/101; A61J 17/1011; A61J 17/1012; A61J 17/105; A61J 17/109; A61J 17/111; A61J 17/1111; A61J 17/1115; A61J 17/113; A61J 9/001; A61J 9/06; A61J 9/0607; A61J 9/0623; A61J 9/0661; A61J 9/0692
See application file for complete search history.

(56) References Cited

U.S. PATENT DOCUMENTS

| | | | | |
|---|---|---|---|---|
| 2,310,515 A * | 2/1943 | Chester | A61J 9/06 248/102 |
| 2004/0079843 A1* | 4/2004 | Medwed | A61J 9/0661 248/104 |
| 2022/0304899 A1* | 9/2022 | Wagner | A61J 17/02 |

* cited by examiner

*Primary Examiner* — Todd J Scherbel
(74) *Attorney, Agent, or Firm* — Dale J. Ream

(57) ABSTRACT

A multi-functional pacifier keeps the baby preoccupied while providing entertainment and nutritional benefits. The assembly includes an interchangeable nipple, refillable liquid cartridges for supplying nutritional liquids and nutrients, a rattle toy attached to a clip hook, a detachable teether, and a glow-in-the-dark strap.

20 Claims, 7 Drawing Sheets

MULTI-FUNCTION PACIFIER ASSEMBLY

REFERENCE TO RELATED APPLICATIONS

This application is a non-provisional application that claims the benefit of U.S. patent application No. 63/397,998 filed Aug. 15, 2022 and titled Multi-Function Pacifier Assembly, which is incorporated herein in its entirety.

BACKGROUND OF THE INVENTION

This invention relates generally to pacifiers and, more particularly, to a multi-function pacifier assembly having an interchangeable nipple, entertainment and developmental accessories, and a glow-in-the-dark strap so as to be useful throughout a toddler's early development years.

Traditional pacifiers are used primarily to placate or, literally, to pacify an infant or toddler for a period of time to keep them from crying and, as a result, to enable the child's caregivers to attend to other tasks. If properly utilized and configured, however, a pacifier can be so much more than just a convenience. As will be described below, there are deficiencies and developmental issues met by other devices that could be handled more efficiently with a properly configured and multi-functional pacifier assembly.

The UN estimates that around 385,000 babies are born each day around the world (140 million a year). There are approximately 10,687 babies born per day and 3,000,750 babies born each year in the United States alone. Newborn babies, until they reach 1 year in age are very likely to use pacifiers. The baby pacifier market size was valued at $352.2 million in 2018 and is expected to reach $522.6 million by 2026.

The CDC estimates only 5% to 13% of breastfed infants and 20% to 37% of formula-fed babies are getting enough vitamin D to meet the new guidelines. This astonishing statistic reveals that an astronomical number of babies are born without enough vitamins in their system. Later on, the newborn child needs around 500 milligrams of calcium each day. Vitamins A, B, C, D, E, and K are also significant supporters of a child's healthy development and growth.

Baby pacifiers, even with their high association with a baby's life, are underutilized for their usefulness. Parents of newborn children constantly need to spend additional dollars and invest time to meet additional needs in a baby's daily life—entertaining the child, providing essential nutrients to the child, pacifying the child etc. Moreover, pacifier makers are almost always limited to selling a few pacifiers in each baby's lifetime with not much recognition of the value because of the existing revenue model. The first distinguishable pacifier was patented in 1901 by Christian W. Meinecke who referred to it as the "Baby Comforter." For decades, the pacifier has maintained the same design and purpose without any major innovation to revolutionize the baby market and offer more benefits to its consumers.

Although a traditional pacifier is presumably effective for its intended purposes, it is still inadequate to meet the nutritional and developmental needs of an infant and the convenience needed by parents or caregivers.

Therefore, it would be desirable to have a multi-functional pacifier assembly to keep the baby preoccupied while providing entertainment and nutritional benefits. Further, it would be desirable to have a multi-functional pacifier assembly that provides either technology, a glow-in-the-dark strap (so that the invention never becomes lost in the dark), and may even include pre-recorded caregiver voices or music.

SUMMARY OF THE INVENTION

A multi-functional pacifier assembly according to the present invention includes a pacifier assembly including a guard shield and a nipple having a mounting portion removably coupled to said guard shield and a bulbous portion displaced from and extending away from said mounting portion. The pacifier assembly includes a liquid dispenser including (1) a casing having a generally cylindrical configuration that defines an interior area and an open top and (2) a fluid chamber selectively received in said interior area through said open top and that defines an interior space for receiving and containing a liquid. The nipple defines an internal chamber in fluid communication with said interior space of said fluid chamber and wherein said bulbous portion defines a pinhole in fluid communication with said internal chamber, such that the liquid is obtained via said pinhole when said bulbous portion of said nipple is sucked on.

In another aspect, the multi-functional pacifier assembly may include a teether toy assembly that includes a ring coupled to a lower end of said casing, said ring including (1) an outer surface having a circular configuration and defining an interior that is hollow and (2) a plurality of solid objects situated in said hollow interior each being unattached so as to make a rattling sound when said ring is shaken. The teething toy assembly functions as a teething device and a rattle.

The pacifier assembly may include a strap assembly having a strap body portion that is luminescent so as to glow-in-the-dark and that includes a pocket having a volume capable of storing a telescopic nipple cover when collapsed.

Therefore, a general object of this invention is to provide a multi-functional pacifier assembly having an interchangeable nipple in fluid communication with a hydration reservoir, entertainment and developmental accessories, and a glow-in-the-dark strap so as to be useful throughout a toddler's early development years.

Another object of this invention is to provide a multi-functional pacifier assembly, as aforesaid, having a refillable or replaceable liquid and nutrient cartridge in communication with a pacifier nipple.

Still another object of this invention is to provide a multi-functional pacifier assembly, as aforesaid, integrated with a chewable teether/rattle toy.

Yet another object of this invention is to provide a multi-functional pacifier assembly, as aforesaid, that includes a strap having an elongate and flexible construction and a fastener for securing the entire pacifier assembly to a babies clothing, a diaper bag, or the like.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
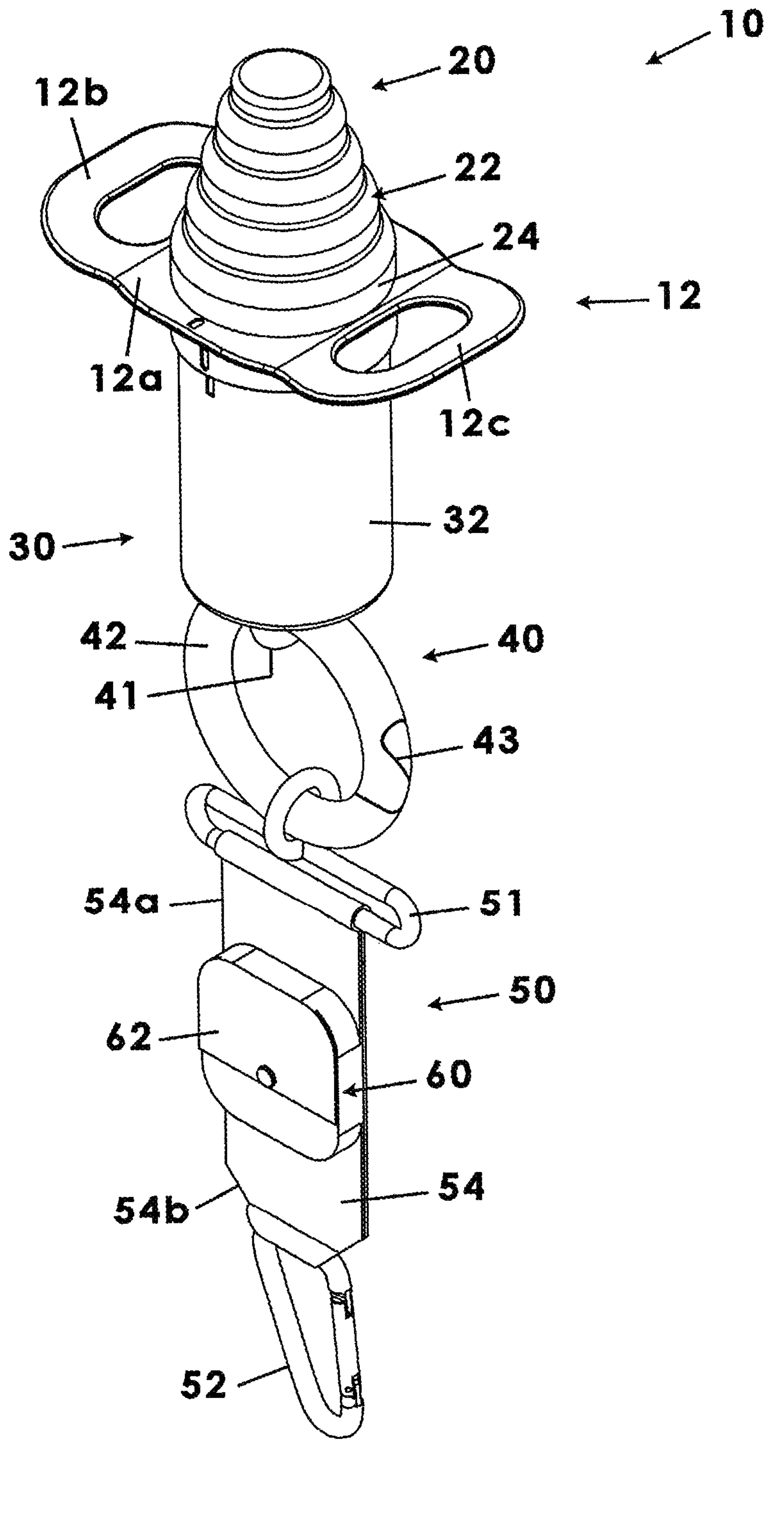
FIG. 1 is a perspective view of a multi-functional pacifier assembly according to a preferred embodiment of the present invention.

A multi-functional pacifier assembly according to a preferred embodiment of the present invention will now be described with reference to the accompanying drawings. In the embodiment, the multi-functional pacifier assembly 10 may include a guard shield 12, a nipple cover 20, a liquid dispenser 30, a teether toy assembly 40, and a strap assembly 50.

The multi-functional pacifier assembly 10 includes a guard shield 12 having a generally traditional configuration except as specifically noted below. Sometimes referred to as a pacifier handle or pacifier holder, the guard shield serves two important purposes. First, the guard shield 12 usually extends laterally from opposite sides of a pacifier nipple and enables a baby or the baby's caregiver to grasp a dropped or stored pacifier so as to insert it again into the baby's mouth. Secondly, and perhaps most importantly, the guard shield 12 provides a laterally winged configuration that is very difficult to be entirely inserted into a baby's mouth and is generally impossible to swallow or become a choking hazard.

Figure 2:
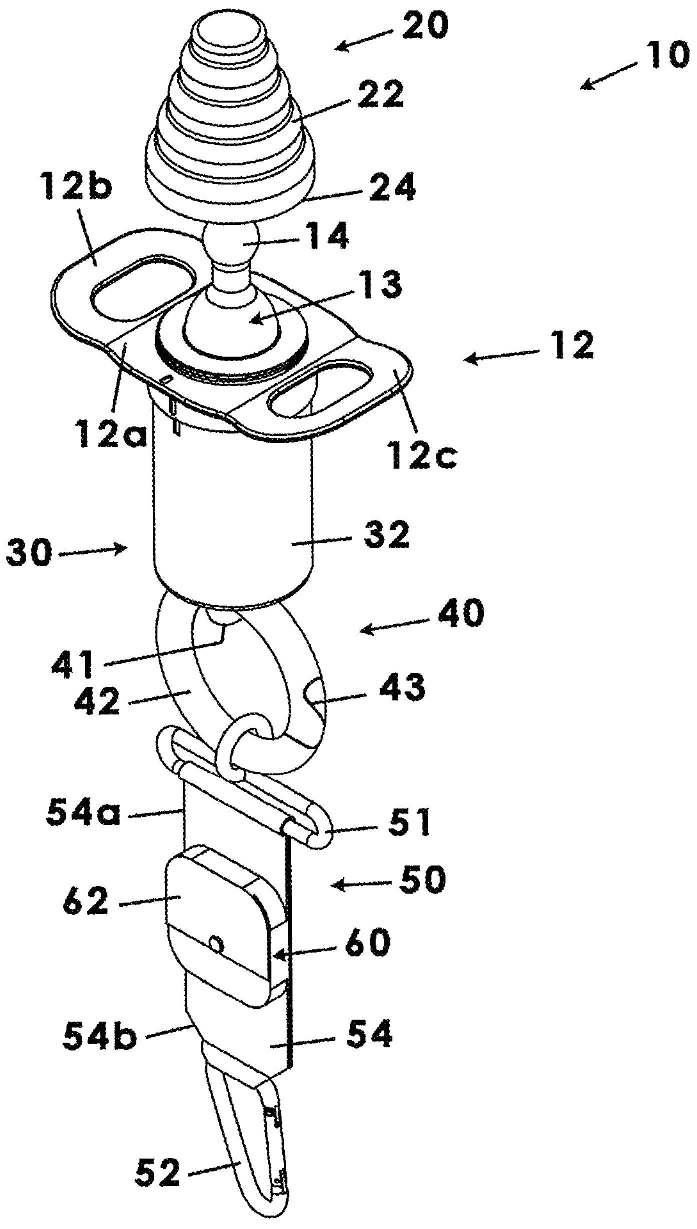
FIG. 2 is another perspective view of the pacifier assembly as in FIG. 1, illustrated with a nipple cover partially exploded according to the present invention.
Figure 3:
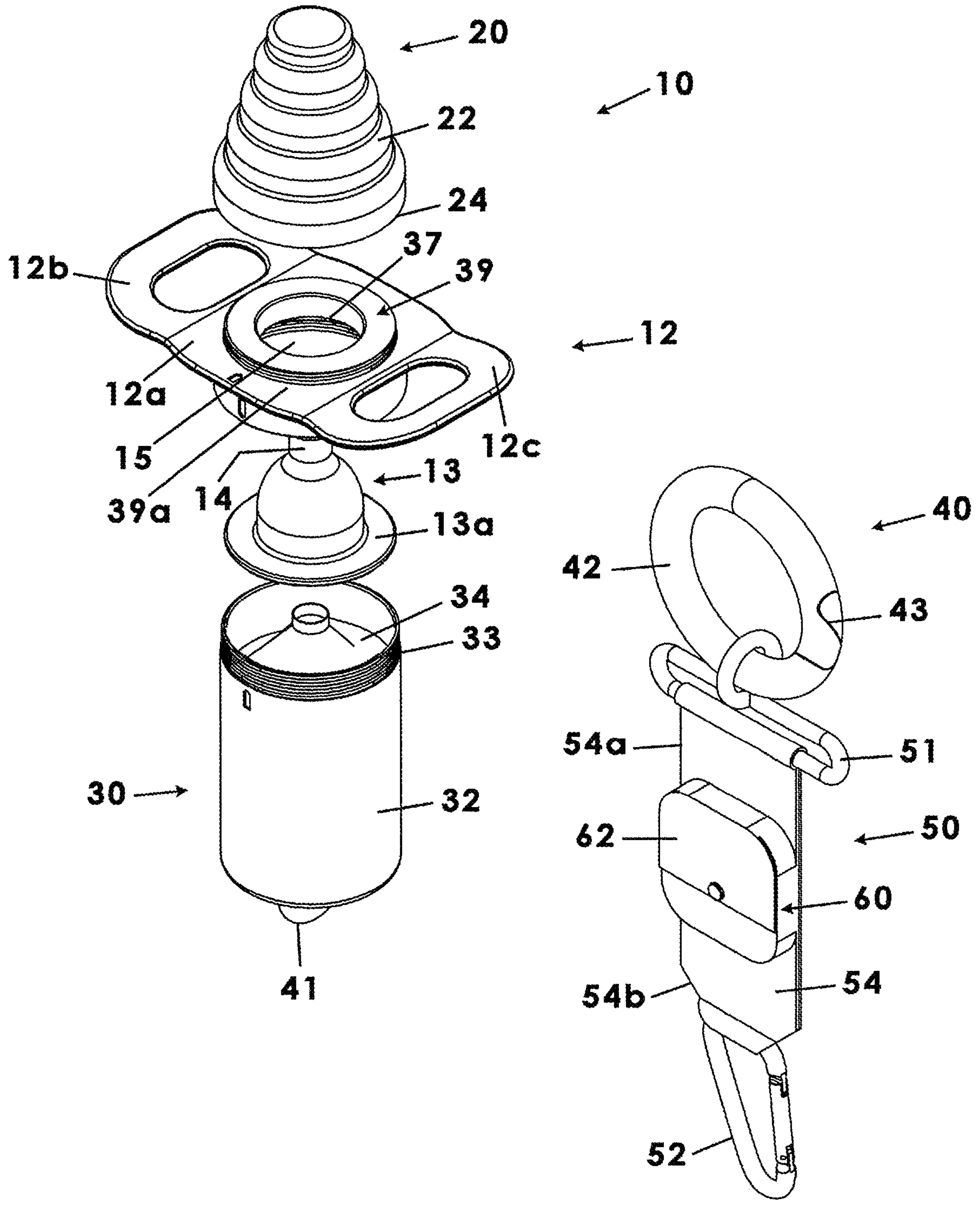
FIG. 3 is an exploded view of the pacifier assembly as in FIG. 2.

In the present invention, the pacifier assembly 10 includes the guard shield 12 and a nipple 13 having a mounting portion 13*a* (i.e., a base) removably coupled to the guard shield and a bulbous portion 14 that is essentially opposite the mounting portion 14*a* so as to extend away from the guard shield 12 (FIG. 3). Preferably, the bulbous portion 14 has a spherical or rounded configuration that is conducive to being sucked on by an infant. In an embodiment, the bulbous portion 14 may define a pinhole 16 a or a plurality of pinholes through which a liquid may be drawn when the bulbous portion 14 is sucked on as will be described later in greater detail. With further reference to the guard shield, the guard shield 12 may include a central section 12*a* having a generally flat or planar configuration and a pair of wings sections 12*b*, 12*c* generally extending away from opposing lateral edges of the central section 12*a*. As best shown in FIG. 2, the wings sections 12*b*, 12*c* are shown to curve upwardly, i.e., to have an inwardly concave curvature that is intended to conform to the curvature of a baby's cheeks so that they guard shield 12 is comfortable when the bulbous portion 14 of the nipple 13 is sucked on. Further, it is understood that each wing section may define an opening making it easier for a baby or a caregiver to grasp the guard shield 12 between a single finger and thumb.

Figure 5A:
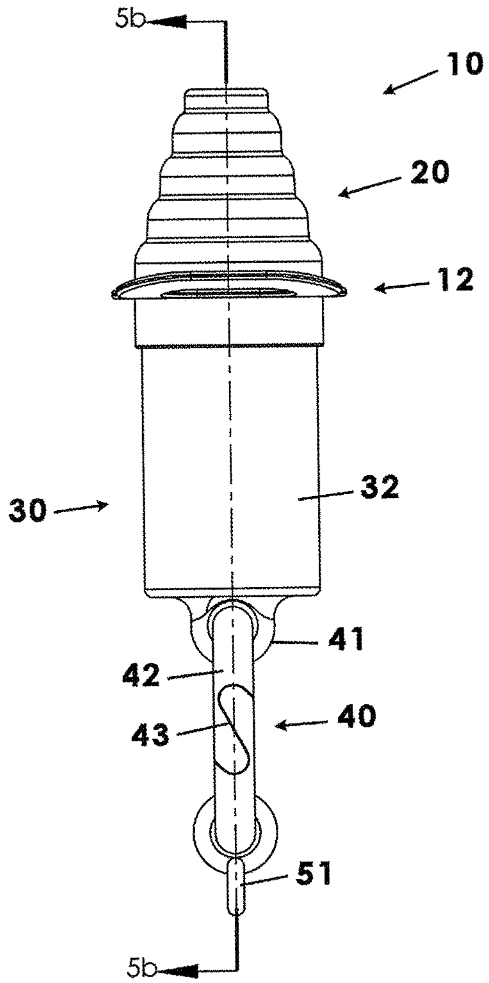
FIG. 5*a* is a side view of the pacifier assembly as in FIG. 1.
Figure 5B:
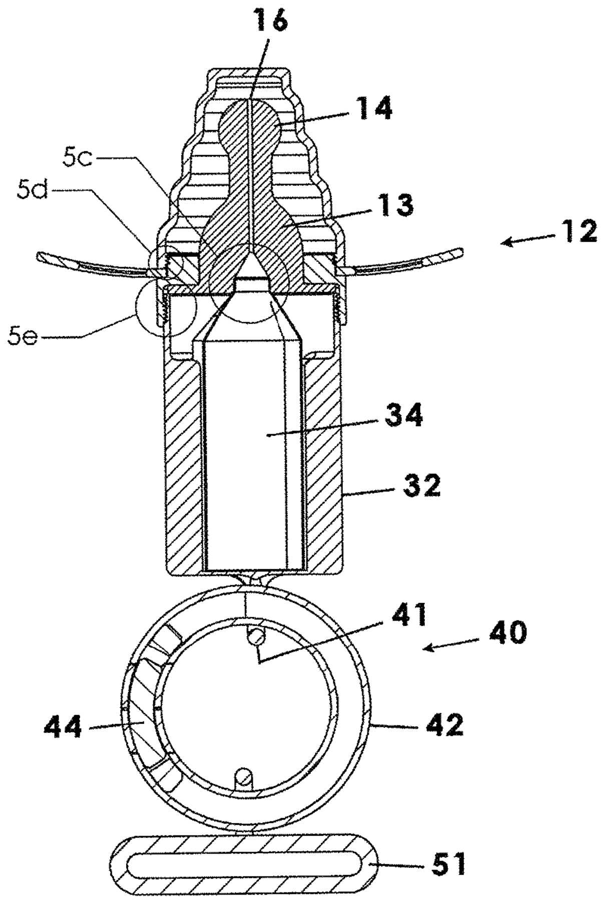
FIG. 5*b* is a sectional view taken along line 5*b*-5*b* of FIG. 5*a;*
Figure 5C:
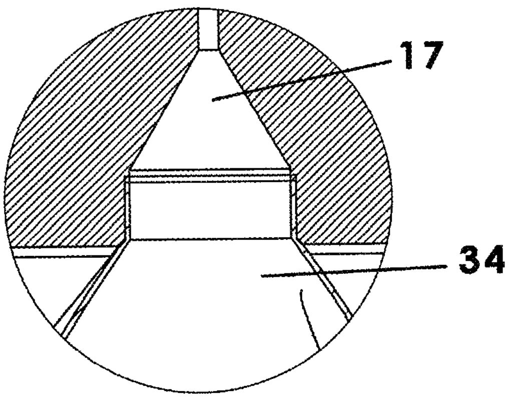
FIG. 5*c* is an isolated view on an enlarged scale taken from FIG. 5*b;*

In a critical aspect, the central section 12*a* defines a through-bore 15 (which will also be referred to as an opening, void, bore, aperture or the like) having dimensions that are complementary to dimensions of the mounting portion 14*a* of the nipple 13 such that the nipple 13 in general and bulbous portion 14, in particular, may be inserted through the through-bore 15. As will be discussed later, the mounting portion 14*a* of the nipple 13 may be mounted between an upper extent of the liquid dispenser 30 and the guard shield 12. Importantly, the bottom of the mounting portion 14*a* is open and the nipple 13 defines an internal chamber 17 (also referred to as a channel 17) such that liquid may be drawn through said internal chamber 17 for egress through the pinhole 16 when the bulbous portion 14 is sucked on (FIG. 5*b*).

In another aspect, the multi-functional pacifier assembly 10 includes a liquid dispenser 30 releasably coupled to the guard shield 12 and in fluid communication with the nipple 13 for providing juice and other nutrients to a baby. In an embodiment, the liquid dispenser 30 may include a 2-part configuration—with one part being permanent and a second part being replaceable or refillable with a liquid. More particularly, the liquid dispenser 30 may include (1) a casing 32 having a generally cylindrical configuration having an inner wall 31*a* that defines an open top and (2) a fluid chamber 34 having one or more walls configured to define an interior space capable of receiving and containing a liquid. For instance, the casing 32 may be constructed of metal or a hard plastic material that is durable and permanent whereas the fluid chamber 34 may be referred to as a cartridge and may be constructed of a less durable material such as cardboard, thin plastic, or have a configuration that is refillable from a larger receptacle.

Figure 4A:
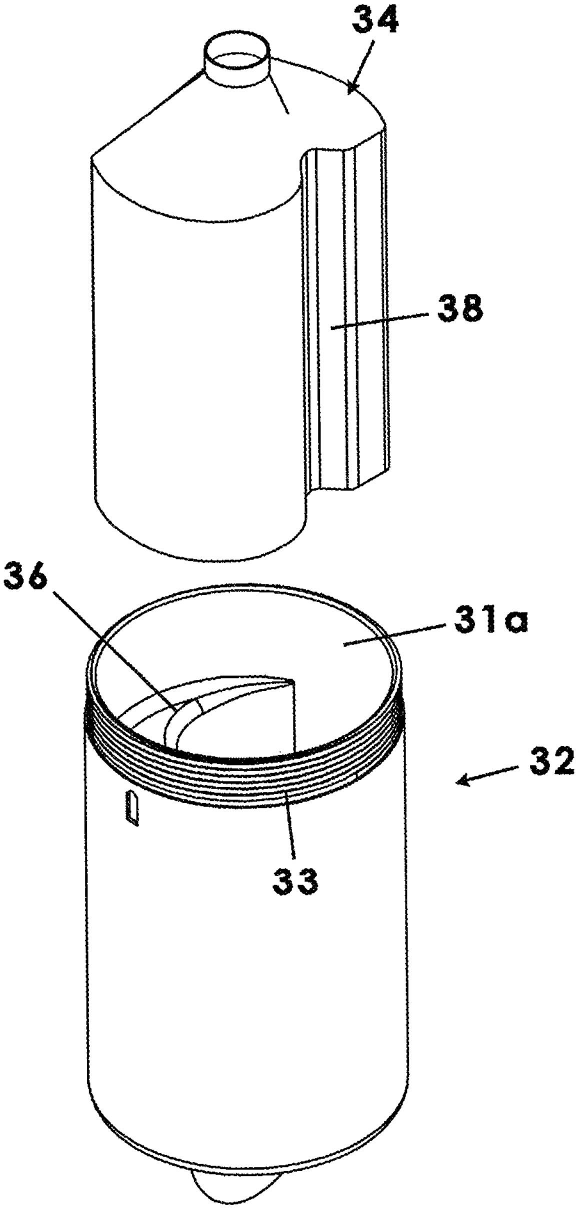
FIG. 4*a* is an exploded view of a liquid dispenser assembly according to the present invention.
Figure 4B:
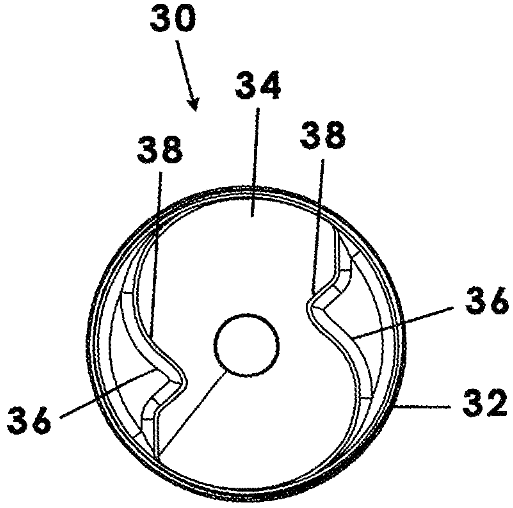
FIG. 4*b* is a top view of the liquid dispenser assembly as in FIG. 4*a;*

In an important aspect, the fluid chamber 34 is configured to nest in the interior area of the casing 32. For instance, the fluid chamber 34 may be refilled or individually packaged with a predetermined quantity of juice, milk, probiotics, electrolytes, vitamins, or other nutrients deemed advantageous to an infant and then the fluid chamber may be nested inside the casing 32 and made available for ingestion by a baby via the pinhole 16 in the manner described previously. Preferably, the fluid chamber 34 and casing 32 include physical structures that prevent rotational movement, rattling, imbalance, or the like. More particularly, the casing 32 may include at least one rib 36 mounted to and extending inwardly away from the inner casing wall 36*a*, the at least one rib 36 having an irregular shape. Preferably, the casing 32 includes a pair of ribs 36 opposite one another and extending toward one another as shown in FIG. 4*b*. In an embodiment, the fluid chamber 34 has an exterior wall that is configured complementary to the ribs 36 described above. In other words, the exterior wall 38*a* (or pair of opposing exterior walls as the case may be) defines a recessed channel 38 configured to mate or nest with a respective rib 36 (FIGS. 4*a* and 4*b*). Accordingly, when the fluid chamber 34 is received and nested in the interior area defined by the casing 32, the fluid chamber 34 is prevented from undesirable rotation.

The liquid dispenser 30 may then be coupled to the guard shield 12 such that the liquid held in the interior space of the chamber 34 may be made available to the baby via the pinhole 16 as described above. Logistically, the casing 32 includes an upper end having a plurality of exterior threads 33 (i.e., outwardly extending threads). Correspondingly, the guard shield 12 includes a structure having a plurality of interior threads 37 (i.e., inwardly extending threads) such that the casing 32 may be threadably coupled to the guard shield 12. More particularly, the guard shield 12 may include a hub 39 having a generally cylindrical configuration that surrounds the through-bore 15, the hub 39 potentially having an upper portion and a lower portion positioned above and below the central section 12*a* of the guard shield 12, respectively (FIG. 3). In an embodiment, it is the inner surface of the upper portion of the hub 39 that includes the interior threads 37 that threadably mate with the exterior threads 33 as described above.

In an embodiment, the nipple 13 is removably positioned/mounted by being sandwiched between the upper end of the casing 32 and the guard shield 12 when the casing is threadably coupled thereto. More particularly, the nipple 13 is loose and released to be replaced or stored when the liquid dispenser 30 is threadably released from the guard shield 12.

In a critical aspect, the multi-functional pacifier assembly 10 includes a teether toy assembly 40 having a configuration that provides the functionality of both a baby rattle and a teething device. First, a lug 41 or similar fastener defining a center opening is mounted to an exterior surface of a lower or bottom wall of the casing 32 (FIG. 5*a*), the lug 41 providing the structure to which the ring 42 of the teether toy assembly 40 is coupled and from which it hangs or dangles. More particularly, the teether toy assembly 40 includes a ring 42 that is comprised of an outer surface having a circular configuration. Stated another way, the ring 42 is constructed of a continuous wall that defines a hollow interior. In an embodiment, the continuous wall includes a cut 43 having an S-shaped configuration such that the ring 42 may be removed from the lug 41 when the continuous wall is flexed along the cut line to an open configuration. The continuous wall of the ring 42 may be constructed of a thermoplastic elastomer material such that the ring 42 is maintained but is still flexible enough to be flexed and removed from the lug 41. Further, construction of the ring using thermoplastic elastomeric material is preferred as being suitable for chewing by a baby who is at a teething level of development.

Further, the teether toy assembly 40 has a construction such that it may be used as a rattle. As shown in FIG. 5*b*, the teether toy assembly 40 may include a plurality of solid objects 44 situated in the hollow interior defined by the ring 42. Preferably, the plurality of solid objects may include rocks, pebbles, precious stones, seeds, and in some embodiments, teeth or bone fragments.

Having a multi-functional pacifier assembly that includes a rattle is important for many reasons. Rattles let babies explore their sense of touch as they hold, feel and play with them. The various sounds from the rattle aid in the baby's sense of hearing. Further, rattles in different patterns, colors and designs help in improving the baby's color recognition. Put simply, rattles are exciting and engaging toys that sustain the attention of most babies. Rattles develop a baby's fine motor skills as they grasp and manipulate the rattle. Further, rattles improve a baby's hand-eye coordination and teach about tones, rhythms, tunes, and volumes in a cause-and-effect environment.

In another embodiment (not shown), the teething toy assembly may be configured to include and enhanced feature using Bluetooth technology such that a parent or caregiver may upload other sounds, music, voice, or a lullaby.

Figure 5D:
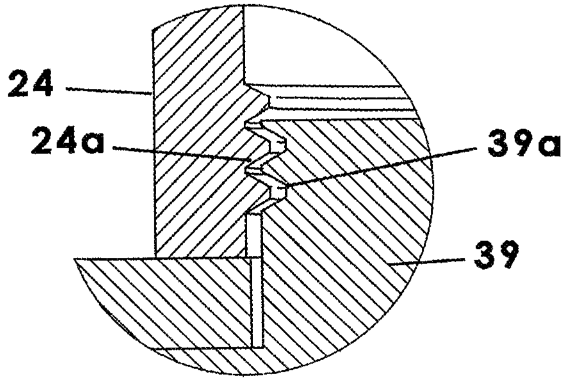
FIG. 5*d* is an isolated view on an enlarged scale taken from FIG. 5*b;*
Figure 5E:
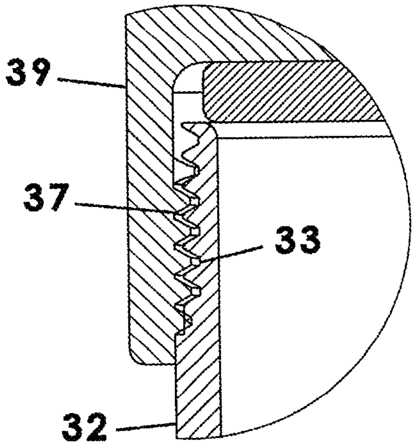
FIG. 5*e* is an isolated view on an enlarged scale taken from FIG. 5*b;*
Figure 6A:
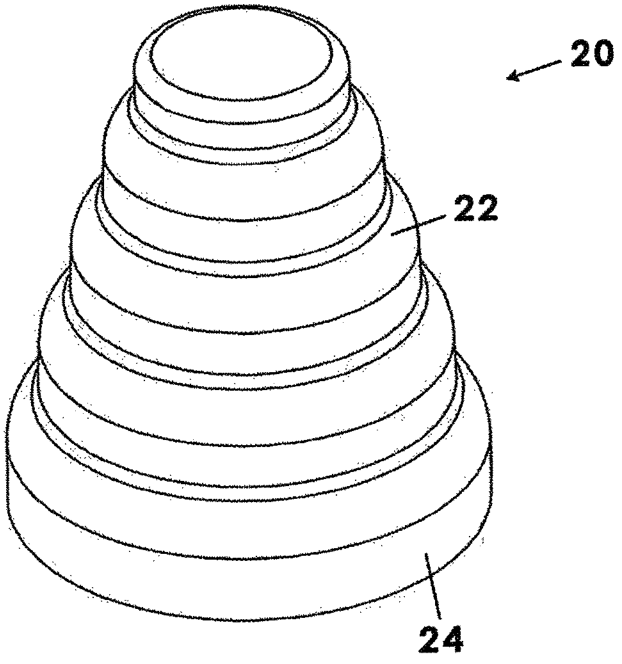
FIG. 6*a* is a perspective view of a nipple cover according to the present invention, illustrated in an extended configuration.
Figure 6B:
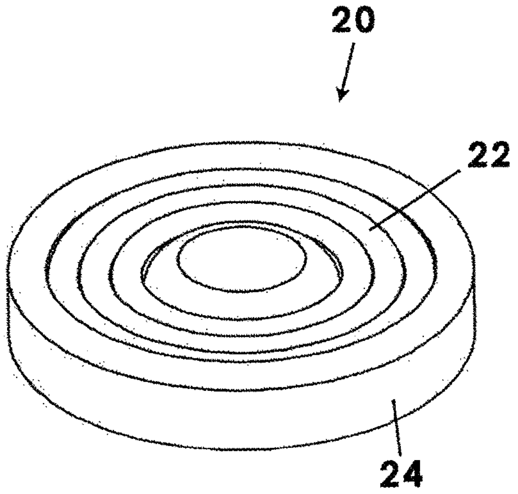
FIG. 6*b* is a perspective view of the nipple cover as in FIG. 6*a*, illustrated in a collapsed configuration.
Figure 6C:
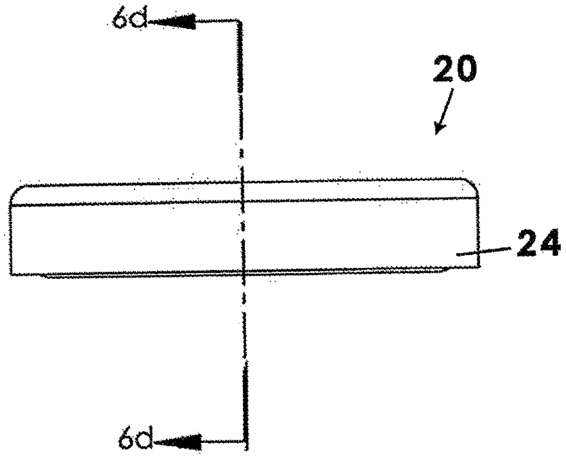
FIG. 6*c* is a side view of the nipple cover as in FIG. 6*b*.
Figure 6D:
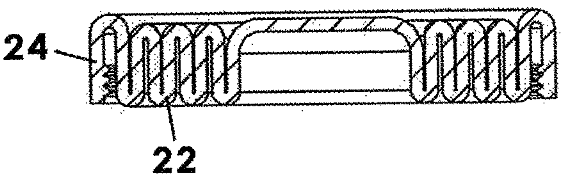
FIG. 6*d* is a sectional view taken along line 6*d*-6*d* of FIG. 6*c*.

In an embodiment, the multi-functional pacifier assembly 10 includes a nipple cover 20 having a plurality of wall portions 22 that are each vertically movable relative to one another such that the nipple cover 20 is movable between a fully extended configuration (FIG. 6*a*) and a fully collapsed configuration (FIG. 6*b*). In one embodiment, the nipple cover 20 may have a unitary construction in which the wall portions 22 extend or retract in an accordion-style manner, the material having a semi-rigid configuration such that it is not deployed or retracted by accident. In another embodiment, the plurality of wall portions 22 may be slidable in a friction fit relationship. Further, the plurality of wall portions 22 each have a diameter that is incrementally larger than a prior wall portion such that the plurality of wall portions have a stacked configuration, i.e., that respective wall portions are concentric and stacked atop one another. Preferably, a lowest wall portion has a largest diameter and is constructed as a rigid rim 24 that is open and in communication with the hollow interior area that is collectively defined by the plurality of wall portions when situated at the fully extended configuration. Logistically, the nipple cover 20 may be extended to an extent sufficient to completely receive and cover the nipple 13 and the bulbous portion 14 within the hollow interior area. Preferably, rim 24 includes a plurality of inwardly extending threads 24*a*. Further, the upper portion of the hub includes a plurality of outwardly extending threads 39*a* such that the rim 24 may be threadably coupled to the hub 39 (FIG. 5*d*).

In another aspect, the multi-functional pacifier assembly 10 may include a strap assembly 50 coupled to the teether toy assembly 40 so as to dangle or depend therefrom. In an embodiment, the strap assembly 50 includes a first fastener 51 coupled to a lower surface of the ring and a second fastener 52 that is opposite to and displaced from the first fastener 51 and a strap body portion 54 extending between the first and second fasteners 51, 52. Preferably, the strap body portion 54 is constructed of a flexible material that is both durable and flexible, such as polyester, polypropylene, high-performance nylon, or the like. In an embodiment, the strap body portion 54 may have an elongate configuration or may include more than one segment coupled together with clips or similar fasteners.

Of critical importance, the strap body portion 54 may be luminescent such that it may glow in the dark. Clearly, a luminescent construction enables the strap (and, by proximity and attachment, the entire multi-functional pacifier assembly 10) to be located in a dark room, such as at night. Glow in the dark fabric includes threads dyed with photoluminescent ink which may contain phosphor that naturally radiates visible light after being energized or charged from exposure to a light source such as sunlight, a fluorescent bulb, a UV light, or a black light. The fabric absorbs the light energy making it "charged" and then stores it until the lights go out. The longer the fabric is exposed to light, the brighter it will glow in the dark. Typically, the light released will be brighter immediately after charge as the atoms are excited and will begin to fade gently as the atoms calm down.

It is understood that phosphor glows green for a longer period than other colors an emits a stronger glow effect than other inks. Luminescent material is also preferred for use with a children's accessory in that luminescent ink is water based and non-toxic.

The fasteners described above may be specific to the respective purposes of the strap assembly 50. Namely, the first fastener 51 may be a strap loop having a first bar configured for dangling attachment to the teether toy assembly 40 and a second bar configured for attachment of a proximal end 54*a* of the strap body portion 54 (FIGS. 1 and 3). The second fastener 52 is coupled to a distal end 54*b* of the strap body portion 54, displaced from and opposite the first fastener 51. Preferably, the second fastener 52 may be a carabineer or other fastener configured for quick connection and release from a belt loop, button, diaper bag ring, or the like. It is understood that the second fastener 52 is configured for attachment to another strap assembly, i.e., to a secondary or auxiliary strap portion.

In another aspect, the multi-functional pacifier assembly 10 may include a storage container 60 mounted to the strap body portion 54 of the strap assembly 50. The storage container 60 may also be referred to as a pouch. The storage container 60 includes at least a continuous wall or a plurality of walls that together define an interior space having a geometric volume configured to receive completely the nipple cover 20 when the nipple cover 20 is at the collapsed configuration (FIG. 6*b*). It is understood that the storage container 60 may include a flap 62 that may be opened or closed, the flap 62 being movable between a closed configuration that blocks access to the interior space and an open configuration that allows access to the interior space.

In use, the multi-functional pacifier assembly 10 includes multiple assemblies that may be desirable and useful to an infant in all aspects of early development. For instance, the multi-functional pacifier assembly 10 includes a nipple 13 in communication with a liquid dispenser 30 so as to provide nutrients needed by the baby. Further, the multi-functional pacifier assembly 10 includes a teether toy assembly 40 which includes an integrated rattle and also includes a luminescent strap assembly 50 that is useful to locate the overall assembly in the dark.

It is understood that while certain forms of this invention have been illustrated and described, it is not limited thereto except insofar as such limitations are included in the following claims and allowable functional equivalents thereof.

The invention claimed is:

1. A multi-functional pacifier assembly, comprising:

a guard shield and a nipple having a mounting portion removably coupled to said guard shield and a bulbous portion displaced from and extending away from said mounting portion;

a liquid dispenser including (1) a casing having a generally cylindrical configuration that defines an interior area and an open top and (2) a fluid chamber selectively received in said interior area through said open top and that defines an interior space for receiving and containing a liquid, said casing having an upper end threadably and releasably coupled to said guard shield, said nipple being sandwiched between said upper end of said casing and said guard shield when said casing is coupled to said guard shield;

wherein said nipple defines an internal chamber in communication with said interior space of said fluid chamber and wherein said bulbous portion defines a pinhole in fluid communication with said internal chamber, such that the liquid is obtained via said pinhole when said bulbous portion of said nipple is sucked on;

a teether toy assembly that includes a ring coupled to a lower end of said casing, said ring including (1) an outer surface having a circular configuration and defining an interior that is hollow and (2) a plurality of solid objects situated in said hollow interior each being unattached so as to make a rattling sound when said ring is shaken;

a strap assembly that includes (1) a first fastener coupled to said ring so as to dangle therefrom, (2) a second fastener opposite and displaced from said first fastener, and a strap body portion extending between said first and second fasteners, said strap body portion being constructed of a flexible fabric material that is luminescent so as to glow-in-the-dark.

2. The multi-functional pacifier assembly as in claim 1, wherein said nipple is removable when said casing is released from said guard shield.

3. The multi-functional pacifier assembly as in claim 1, wherein:

said guard shield includes a central section having a generally planar configuration and a pair of wing sections extending away from opposing lateral edges of said central section at an inwardly concave angle; and said central section defines a through-bore through which at least said bulbous portion of said nipple is received.

4. The multi-functional pacifier assembly as claim 3, wherein:

said guard shield includes a hub having a cylindrical configuration that surrounds and extends through said through-bore, said hub having an inner surface having a plurality of interior threads; and said upper end of said casing includes an outer surface having a plurality of exterior threads such that said casing is selectively and threadably coupled to said interior threads of said hub.

5. The multi-functional pacifier assembly as in claim 1, wherein said outer surface of said ring of said teether toy assembly is constructed of a thermoplastic elastomer material suitable for chewing in a manner indicative of teething and such that said ring has a flexible configuration.

6. The multi-functional pacifier assembly as in claim 5, wherein said outer surface of said ring of said teether toy assembly includes a cut having an S-shaped configuration such that said ring is configured for removal from a lug mounted to said lower end of said casing when said outer surface is flexed.

7. The multi-functional pacifier assembly as in claim 1, further comprising a nipple cover having a plurality of wall portions each having incrementally larger diameters stacked atop one another and telescopically movable between an extended and a collapsed configuration, said nipple cover defining a hollow interior area for receiving and covering said bulbous portion of said nipple when positioned at said extended configuration.

8. The multi-functional pacifier assembly as in claim 7, wherein:

said nipple cover includes a bottom rim that is rigid and defines an open bottom in communication with said hollow interior area of the cover, said bottom rim having an inner surface that is threaded; and said hub has an upper portion having an outer surface that is threaded such that said bottom rim is selectively and threadably coupled to said upper portion of said hub.

9. The multi-functional pacifier assembly as in claim 1, wherein said first fastener includes strap loop coupled to a first end of said strap body portion and said second fastener is a carabiner attached to a second end of said strap body portion for quick-connect securement of the strap assembly to a baby's clothing or diaper bag.

10. The multi-functional pacifier assembly as in claim 1, further comprising a storage container fixedly mounted to said strap body portion, said storage container defining an interior space and a flap that is movable between a closed configuration that blocks access to the interior space and an open configuration that allows access to the interior space, said interior space defining a volume sufficient to receive said nipple cover therein when said nipple cover is at said collapsed configuration.

11. The multi-functional pacifier assembly as in claim 1, wherein:

said casing includes at least one rib having an irregular shape configuration and extending inwardly away from an inner casing wall in said interior area of said casing; and said fluid chamber includes an exterior wall defining at least one recessed channel configured to nest with said at least one rib of said casing so as to prevent movement of said fluid chamber when received in said interior area of said casing.

12. A multi-functional pacifier assembly, comprising:

a guard shield and a nipple having a mounting portion removably coupled to said guard shield and a bulbous portion displaced from and extending away from said mounting portion;

a liquid dispenser including (1) a casing having a generally cylindrical configuration that defines an interior area and an open top and (2) a fluid chamber selectively received in said interior area through said open top and that defines an interior space for receiving and containing a liquid, said casing having an upper end threadably and releasably coupled to said guard shield;

wherein said nipple defines an internal chamber in fluid communication with said interior space of said fluid chamber and wherein said bulbous portion defines a pinhole in fluid communication with said internal chamber, such that the liquid is obtained via said pinhole when said bulbous portion of said nipple is sucked on;

wherein:

said casing includes at least one rib having an irregular shape configuration and extending inwardly away from an inner casing wall in said interior area of said casing;

said fluid chamber includes an exterior wall defining at least one recessed channel configured to nest with said at least one rib such that movement of said fluid chamber is prevented when received in said interior area of said casing;

a teether toy assembly that includes a ring coupled to a lower end of said casing, said ring including (1) an outer surface having a circular configuration and defining an interior that is hollow and (2) a plurality of solid objects situated in said hollow interior each being unattached so as to make a rattling sound when said ring is shaken; and a strap assembly that includes (1) a first fastener coupled to said ring so as to dangle therefrom, (2) a second fastener opposite and displaced from said first fastener, and a strap body portion extending between said first and second fasteners, said strap body portion being constructed of a flexible fabric material that is luminescent so as to glow-in-the-dark.

13. The multi-functional pacifier assembly as in claim 12, wherein:

said guard shield includes a central section having a generally planar configuration and a pair of wing sections extending away from opposing lateral edges of said central section at an inwardly concave angle; and said central section defines a through-bore through which at least said bulbous portion of said nipple is received.

14. The multi-functional pacifier assembly as in claim 13, wherein:

said guard shield includes a hub having a cylindrical configuration that surrounds and extends through said through-bore, said hub having an inner surface having a plurality of interior threads; and said upper end of said casing includes an outer surface having a plurality of exterior threads such that said casing is selectively and threadably coupled to said inner threads of said hub.

15. The multi-functional pacifier assembly as in claim 14, wherein said nipple is sandwiched between said upper end of said casing and said guard shield when said casing is coupled to said guard shield.

16. The multi-functional pacifier assembly as in claim 14, further comprising a storage container fixedly mounted to said strap body portion, said storage container defining an interior space and a flap that is movable between a closed configuration that blocks access to the interior space and an open configuration that allows access to the interior space, said interior space defining a volume sufficient to receive said nipple cover therein when said nipple cover is at said collapsed configuration.

17. The multi-functional pacifier assembly as in claim 13, wherein said outer surface of said ring of said teether toy assembly is constructed of a thermoplastic elastomer material suitable for chewing and such that said ring has a flexible configuration.

18. The multi-functional pacifier assembly as in claim 17, wherein said outer surface of said ring of said teether toy assembly includes a cut having an S-shaped configuration such that said ring is configured for removal from a lug mounted to said lower end of said casing when said outer surface is flexed.

19. The multi-functional pacifier assembly as in claim 12, further comprising a nipple cover having a plurality of concentric wall portions each having incrementally larger diameters stacked atop one another and configured for telescopic movement between an extended and a collapsed configuration, said nipple cover defining a hollow interior area for receiving and covering said bulbous portion of said nipple when positioned at said extended configuration.

20. The multi-functional pacifier assembly as in claim 19, wherein:

said nipple cover includes a bottom rim that is rigid and defines an open bottom in communication with said hollow interior area of the cover, said bottom rim having an inner surface that is threaded; and said hub has an upper portion having an outer surface that is threaded such that said bottom rim is selectively and threadably coupled to said upper portion of said hub.

* * * * *